(12) United States Patent
Honma et al.

(10) Patent No.: US 8,553,294 B2
(45) Date of Patent: Oct. 8, 2013

(54) OUTLINING METHOD FOR PROPERLY REPRESENTING CURVED LINE AND STRAIGHT LINE, AND IMAGE COMPRESSION METHOD USING THE SAME

(75) Inventors: Toshiki Honma, Amagasaki (JP); Koji Usui, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1053 days.

(21) Appl. No.: 12/560,928

(22) Filed: Sep. 16, 2009

(65) Prior Publication Data
US 2010/0067066 A1 Mar. 18, 2010

(30) Foreign Application Priority Data
Sep. 16, 2008 (JP) .................................. 2008-236771

(51) Int. Cl.
*H04N 1/387* (2006.01)
(52) U.S. Cl.
USPC ........... 358/453; 382/149; 382/178; 382/199; 382/200; 382/201; 382/202; 382/241; 382/242; 382/197
(58) Field of Classification Search
USPC .......... 358/453; 382/453, 149, 178, 199, 200, 382/201, 202, 241, 242, 197
See application file for complete search history.

(56) References Cited

U.S. PATENT DOCUMENTS

2009/0052765 A1* 2/2009 Toyoda et al. ................. 382/149
2009/0074291 A1* 3/2009 Iinuma .......................... 382/178

FOREIGN PATENT DOCUMENTS

| JP | 64-053272 | 3/1989 |
| JP | 08-194816 | 7/1996 |
| JP | 09-134441 | 5/1997 |
| JP | 2005-346137 A | 12/2005 |
| JP | 2006-107100 | 4/2006 |

OTHER PUBLICATIONS

Notice of Grounds of Rejection dated Jun. 15, 2010 issued in the Japanese Patent Application No. 2008-236771, and an English Translation thereof.

* cited by examiner

*Primary Examiner* — Twyler Haskins
*Assistant Examiner* — Michael Burleson
(74) *Attorney, Agent, or Firm* — Buchanan Ingersoll & Rooney PC

(57) ABSTRACT

When generating outline data, the contour pixels of the binarized image data are first extracted. Based on the extracted contour pixels, the contour of the image data is approximated to a straight line. In the straight-line approximation process, the distance between adjacent contour pixels among the extracted contour pixels is calculated. It is determined based on the result of the comparison between the length of the first straight line and the length of the second straight line whether the first straight line is used as a contour of the image data. The first straight line connects the first contour pixel and the second contour pixel adjacent to the first contour pixel. The second straight line connects the second contour pixel and the third contour pixel adjacent to the second contour pixel.

18 Claims, 12 Drawing Sheets

CONTOUR PIXEL EXTRACTION PATTERN

☐ = WHITE PIXEL (HIGH GRAY SCALE)

■ = BLACK PIXEL (LOW GRAY SCALE)

INPUT BINARIZED IMAGE
(REFERENCE)

THRESHOLD VALUE FACTOR 1

THRESHOLD VALUE FACTOR 2

THRESHOLD VALUE FACTOR 3
(OPTIMUM)

THRESHOLD VALUE FACTOR 4

THRESHOLD VALUE FACTORS 5-10
(SAME RESULT)

BINARIZED IMAGE

OUTLINED IMAGE

OUTLINING METHOD FOR PROPERLY REPRESENTING CURVED LINE AND STRAIGHT LINE, AND IMAGE COMPRESSION METHOD USING THE SAME This application is based on Japanese Patent Application No. 2008-236771 filed with the Japan Patent Office on Sep. 16, 2008, the entire content of which is hereby incorporated by reference.

BACKGROUND OF THE INVENTION

1. Field of the Invention

The present invention relates to an outlining method for generating outline data from image data, an image compression method using the same, an outlining apparatus, and an outlining program.

2. Description of the Related Art

A variety of techniques for outlining a character portion included in the image data have been conventionally proposed.

For example, Document 1 (Japanese Laid-Open Patent Publication No. 2005-346137) discloses a technique for generating outlined data by scanning the image printed on a sheet of paper.

In Document 1, when noise such as loss of pixels occurs on the contour of a character during scanning, the noise is removed after outlining process.

In the case of the conventional process of generating outlined data, contour pixels are extracted for each character from the binarized data, the outer contour is subjected to straight-line approximation based on the extracted contour pixels, and the data subjected to straight-line approximation is subjected to curved-line approximation.

For example, in the case where four points including pixels P1-P4 shown in FIG. 17 each are extracted as a contour pixel, a line indicated by a straight line L0 in FIG. 18 is obtained. Then, if certain conditions are satisfied, in place of the lines connecting pixels P1-P4 shown by dashed lines in FIG. 18, straight line L0 is used as an outer contour to generate data for straight-line approximation. Note that straight line L0 is, for example, equally distanced from each of pixels P1-P4. As an example of the certain conditions, the sum of the distances from straight line L0 to pixels P1-P4 reaches a value of not more than a predetermined threshold value.

However, if the outer contour of the character is subjected to straight-line approximation in the manner described with reference to FIGS. 17 and 18, there may be a case where, in the outlined data, the portion that should be represented by a horizontal or vertical line is represented, due to loss of the pixels at the end portion, more or less obliquely with respect to the direction in which the line should extend. Referring to FIGS. 19A and 19B, this will be specifically described.

FIG. 19A is an example of a binarized image of an alphabetic character "E", and FIG. 19B is an example of the data obtained by outlining the binarized image in FIG. 19A.

As understood from the comparison with the corresponding portion in FIG. 19A, a line LX1 forming the outer contour on the underside within the dashed-line circle in the upper left area in FIG. 19B should have been represented by a horizontal line without making any modification to the data of the binarized image, but is subjected to straight-line approximation as explained with reference to FIGS. 17 and 18. This causes line LX1 to extend in the direction intersecting with the horizontal direction (obliquely in the lower right direction).

Furthermore, also as compared with the corresponding portion in FIG. 19A, a line LX2 forming the outer contour on the upper side within the dashed-lined circle in the lower area in FIG. 19B should have been represented by a horizontal line without making any modification to the data of the binarized image, but extends in the direction intersecting with the horizontal direction (obliquely in the upper right direction).

In other words, in the conventional outlining process, in spite of the fact that the outer contour which should have been represented by a horizontal or vertical line is represented by a horizontal or vertical line in the binarized image, the image processing may cause the outer contour to be represented by a line at an angle with respect to the horizontal or vertical direction. If the outer contour of the outlined image that should have been represented by a line extending in the horizontal or vertical direction is represented by a line at an angle with respect to the horizontal or vertical direction, the outer contour becomes conspicuous and the viewer may feel it strange.

SUMMARY OF THE INVENTION

The present invention has been made in light of the above-described circumstances. An object of the present invention is to provide an outlining method, an image compression method using the same, an outlining apparatus, and an outlining program by which, in the process of outlining a binarized image, the image processing can be carried out for obtaining a smooth curved line and the like while leaving a portion appropriate for a straight line as it is in the outer contour included in the binarized image.

An outlining method according to the present invention includes the steps of extracting contour pixels from binarized image data; and performing straight-line approximation for a contour of the image data based on the extracted contour pixels. The step of performing straight-line approximation includes the steps of calculating a distance between adjacent contour pixels among the extracted contour pixels; and determining based on a result of a comparison between a length of a first straight line connecting a first contour pixel and a second contour pixel adjacent to the first contour pixel and a length of a second straight line connecting the second contour pixel and a third contour pixel adjacent to the second contour pixel whether the first straight line is used as a contour of the image data.

An image compression method according to the present invention includes the step of compressing image data including at least image data outlined by the above-described outlining method.

An outlining apparatus according to the present invention includes an extraction unit configured to extract contour pixels from binarized image data; and an approximation unit configured to perform straight-line approximation for a contour of the image data based on the extracted contour pixels. The approximation unit includes a calculation unit configured to calculate a distance between adjacent contour pixels among the extracted contour pixels; and a determination unit configure to determine based on a result of a comparison between a length of a first straight line connecting a first contour pixel and a second contour pixel adjacent to the first contour pixel and a length of a second straight line connecting the second contour pixel and a third contour pixel adjacent to the second contour pixel whether the first straight line is used as a contour of the image data.

An image compression apparatus according to the present invention compresses image data including at least image data outlined by the above-described outlining apparatus.

A computer readable medium according to an aspect of the present invention corresponds to a computer readable medium storing a computer executable program for outlining. The program includes program code for causing a computer to execute the steps of extracting contour pixels from binarized image data and performing straight-line approximation for a contour of the image data based on the extracted contour pixels. The step of performing straight-line approximation includes the steps of calculating a distance between adjacent contour pixels among the extracted contour pixels; and determining based on a result of a comparison between a length of a first straight line connecting a first contour pixel and a second contour pixel adjacent to the first contour pixel and a length of a second straight line connecting the second contour pixel and a third contour pixel adjacent to the second contour pixel whether the first straight line is used as a contour of the image data.

The computer readable medium according to another aspect of the present invention stores a computer executable program for compressing image data including at least image data outlined by executing the above-described program.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of an image processing apparatus according to the present invention will be hereinafter described with reference to the accompanying drawings.

Figure 1:
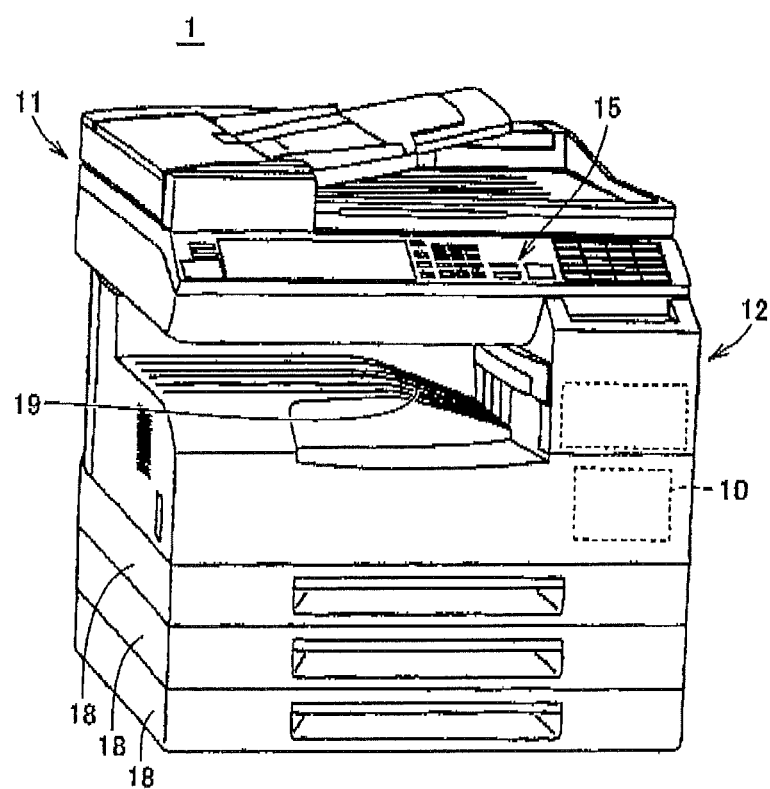
FIG. 1 is an external view of an MFP (Multi Function Peripheral) which is an embodiment of an image processing apparatus of the present invention.

Referring to FIG. 1, an MFP 1 includes an operation panel 15 receiving an operation instruction for each of various processes and input of the data including characters and numerals. Operation panel 15 is provided with a plurality of keys such as a power key operated by the user.

MFP 1 also includes a scanner 11 photoelectrically reading a document to obtain image data a printer (engine) 12 printing an image on the recording sheet based on the image data; a paper feeding unit 18 feeding the recording sheet to printer 12; a tray 19 onto which the recording sheet having an image printed thereon by printer 12 is ejected; and a control unit 10 housing a CPU (central processing unit) 10A and the like described below.

Figure 2:
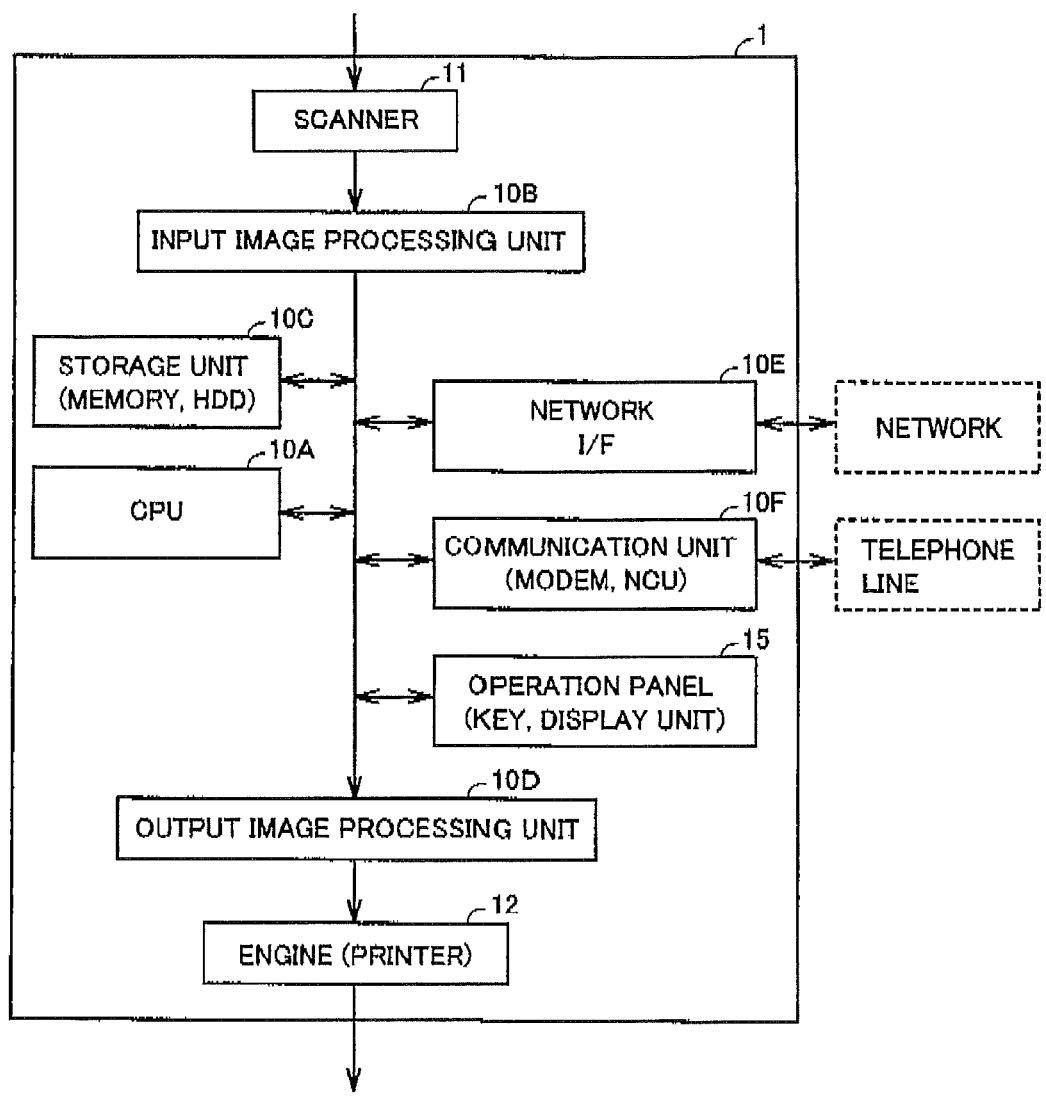
FIG. 2 is a diagram showing a hardware configuration of the MFP in FIG. 1.

Scanner 11 photoelectrically reads the image information such as photos, characters and pictures from the document to obtain image data. The obtained image data is processed as appropriate, and then utilized as data for a file attached to an e-mail message which is transmitted via a network, or transmitted to other equipment over the telephone line or the like, or transmitted to printer 12 to be used for printing, Referring to FIG. 2, in addition to the above-described components, MFP 1 includes an input image processing unit 10B, a storage unit 10C, a CPU 10A, a network I/F (interface) 10E, an output image processing unit 10D, and a communication unit 10F.

In MFP 1, the image data obtained by scanner 11 is transmitted to input image processing unit 10B.

Input image processing unit 10B carries out processes for the input image such as color conversion, color correction, resolution conversion, area discrimination, and the like. The data processed in input image processing unit 10B is stored in storage unit 10C. Storage unit 10C includes a memory such as a DRAM (Dynamic Random Access Memory) and a hard disk drive (HDD) provided with a hard disk which is an example of a magnetic memory. It is to be noted that, in MFP 1, input image processing unit 10B may be embodied, for example, by CPU 10A executing the program stored in storage unit 10C (or a recording medium which is attachable to and detachable from MFP 1), or may be embodied by one or more ASICs (Application Specific Integrated Circuit) mounted in MFP 1.

CPU 10A carries out processes such as overall control of MFP 1, detection of operation to the operation key (keys and the like displayed on the display unit of operation panel 15), display on operation panel 15, conversion of input data into an image file, and the like.

Network I/F 10E includes an I/F unit for transmitting e-mail and the like to a network, which performs protocol generation and the like.

Output image processing unit 10D performs screen control for improving the granularity of the photographic image, smoothing process for improving the smoothness of the edge of a character, PWM (Pulse Width Modulation) control, and the like.

Printer 12 prints the data generated in the output image processing unit on a sheet of paper, Communication unit 10F including a modem and an NCU (Network Control Unit) performs modulation and demodulation of facsimile transmission and reception, generation of the facsimile communication protocol, connection to telephone lines, and the like.

Operation panel 15 includes an operation key and a display unit. The display unit is configured, for example, of a liquid crystal touch panel. The operation key includes, for example, a touch key displayed on the liquid crystal touch panel.

Figure 3:
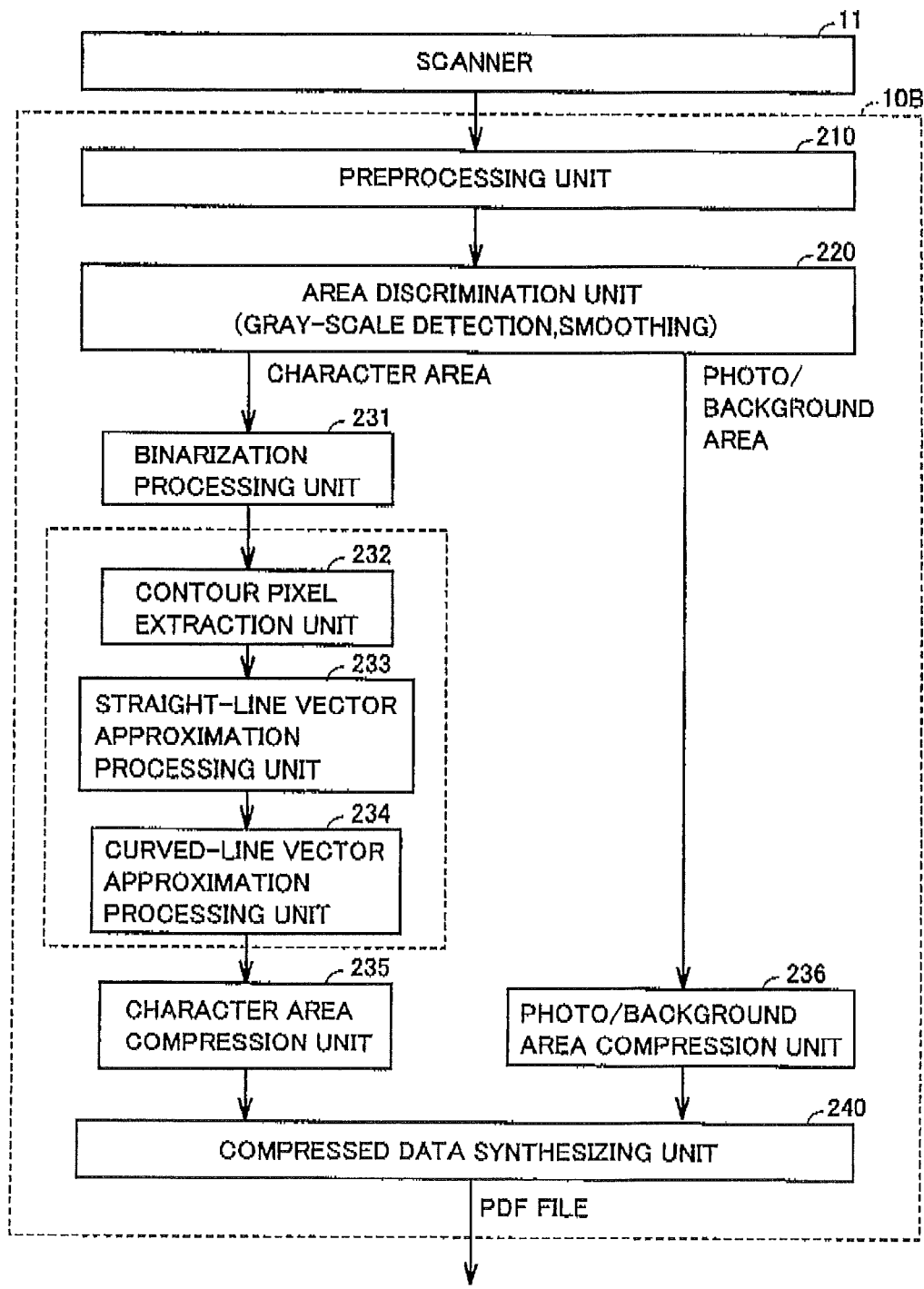
FIG. 3 is a diagram showing a detailed configuration of an input image processing unit in FIG. 2.

Referring to FIG. 3, input image processing unit 10B includes a preprocessing unit 210, an area discrimination unit 220, a binarization processing unit 231, a contour pixel extraction unit 232, a straight-line vector approximation processing unit 233, a curved-line vector approximation processing unit 234, a character area compression unit 235, a photo/background area compression unit 236, and a compressed data synthesizing unit 240.

When scanner 11 scans the document to generate image data, it outputs the image data to preprocessing unit 210.

In preprocessing unit 210, the image data is subjected to processes such as image format conversion, resolution conversion, processing of the base of the image, and the like. The image data subjected to these processes is transmitted to area discrimination unit 220.

In area discrimination unit 220, the image data is divided into a character area and an area including those other than a character (a photo/background area) by first performing area discrimination for a photo, a background, a character and the like.

Area discrimination unit 220 then transmits the image data of the character area to binarization processing unit 231, and also transmits the image data of the photo/background area to photo/background area compression unit 236.

With regard to the image data of the photo/background area, area discrimination unit 220 generates an 8-bit grayscale image from the input 24-bit image data in full color, and subjects the gray-scale image to the smoothing process for eliminating noise. The resultant smoothed image is then subjected to the labeling process, to thereby detect the location of each of a plurality of photo/background areas included in the image data transmitted from preprocessing unit 210.

Binarization processing unit 231 binarizes the input image data of the character area to separate the character and the background from each other. The binarized image data is transmitted to contour pixel extraction unit 232 and subjected to the outline data conversion process performed in contour pixel extraction unit 232, straight-line vector approximation processing unit 233 and curved-line vector approximation processing unit 234.

In contour pixel extraction unit 232, the binarized character image is scanned to extract contour pixels by pattern matching.

A pixel located in the contour portion of the image is herein referred to as a "contour pixel".

Figure 5A:
FIGS. 5A and 5B are diagrams for illustrating the manner of extraction of contour pixels performed in the MFP in FIG. 1.
Figure 5B:
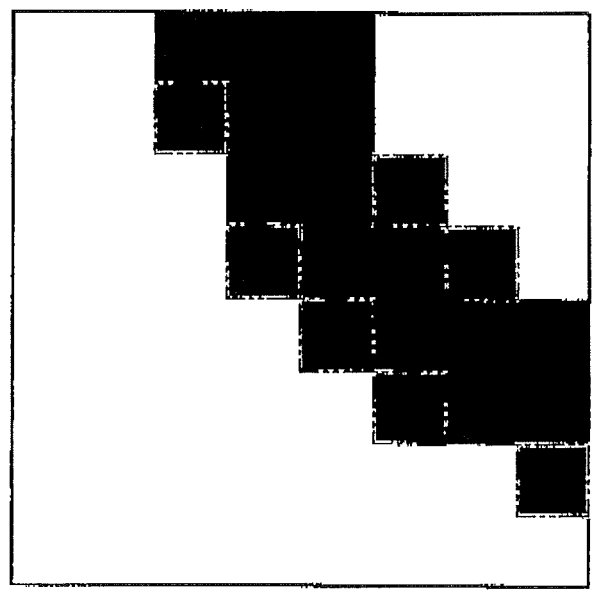

FIG. 5A shows an example of a contour pixel extraction pattern used for pattern matching. FIG. 5B shows an enlarged view of a portion of the binarized character image. The binarized character image is scanned (for example, in units of four pixels) to extract the pixel matching any of the patters in FIG. 5A as a contour pixel. By way of example, as shown in FIG. 5B, this pattern matching allows the pixel surrounded by a chain double-dashed line to be extracted as a contour pixel.

After the contour pixel is extracted in contour pixel extraction unit 232, the image data is transmitted to straight-line vector approximation processing unit 233. In straight-line vector approximation processing unit 233, with respect to the contour pixel extracted in contour pixel extraction unit 232, the contour pixels adjacent thereto are represented as one vector, which causes the contour of the character image to be approximated to a straight line. The data of the character image having its contour approximated to a straight line in straight-line vector approximation processing unit 233 is transmitted to curved-line vector approximation processing unit 234.

In curved-line vector approximation processing unit 234, a control point is set as appropriate in accordance with the conditions of the curved line, with respect to the straight-line vector of the contour of the character image generated in straight-line vector approximation processing unit 233. Based on the control point, the contour of the character image is then approximated to a curved line.

By way of example, MFP 1 according to the present embodiment is characterized by the setting of the control point in accordance with the conditions of the curved line. It is to be noted that well-known techniques can be employed for the setting of the straight-line vector based on the contour pixels in straight-line vector approximation processing unit 233 and the curved-line approximation based on the control point in, curved-line vector approximation processing unit 234, and therefore, description thereof will not be repeated.

In character area compression unit 235, the data suitable for the character area is compressed. Furthermore, in photo/background area compression unit 236, the data suitable for the photo/background area is compressed. Since the image data of the character area serves as vector data (location information), it is considered that reversible compression method such as an FLATE compression method is suitable. With regard to the photo/background area, if a reduction in file size is prioritized over maintaining of the image quality, it is considered that the irreversible compression method is suitable, such as a JPEG (Joint Photographic Experts Group) compression method in which, for example, the compression ratio is set relatively high.

Compressed data synthesizing unit 240 synthesizes the image data of the character area compressed in character area compression unit 235 and the image data of the photo/background area compressed in photo/background area compression unit 236, to generate a PDF (Portable Document Format) file and output the file to storage unit 10C.

In MFP 1, the character data and the photo data are subjected to compression suitable for characters and photos, respectively, and finally superimposed one on top of the other to form a layer and generate data in one PDF file format. This allows the image data to be converted to a file smaller in size than that compressed in a single compression method (for example, JPEG compression).

As described above, in MFP 1, the image read by scanner 11 is processed in input image processing unit 10B and thereby converted to a PDF file in which the character area and the photo/background area are compressed using different compression methods. The converted PDF file is then stored in storage unit 10C.

Figure 4:
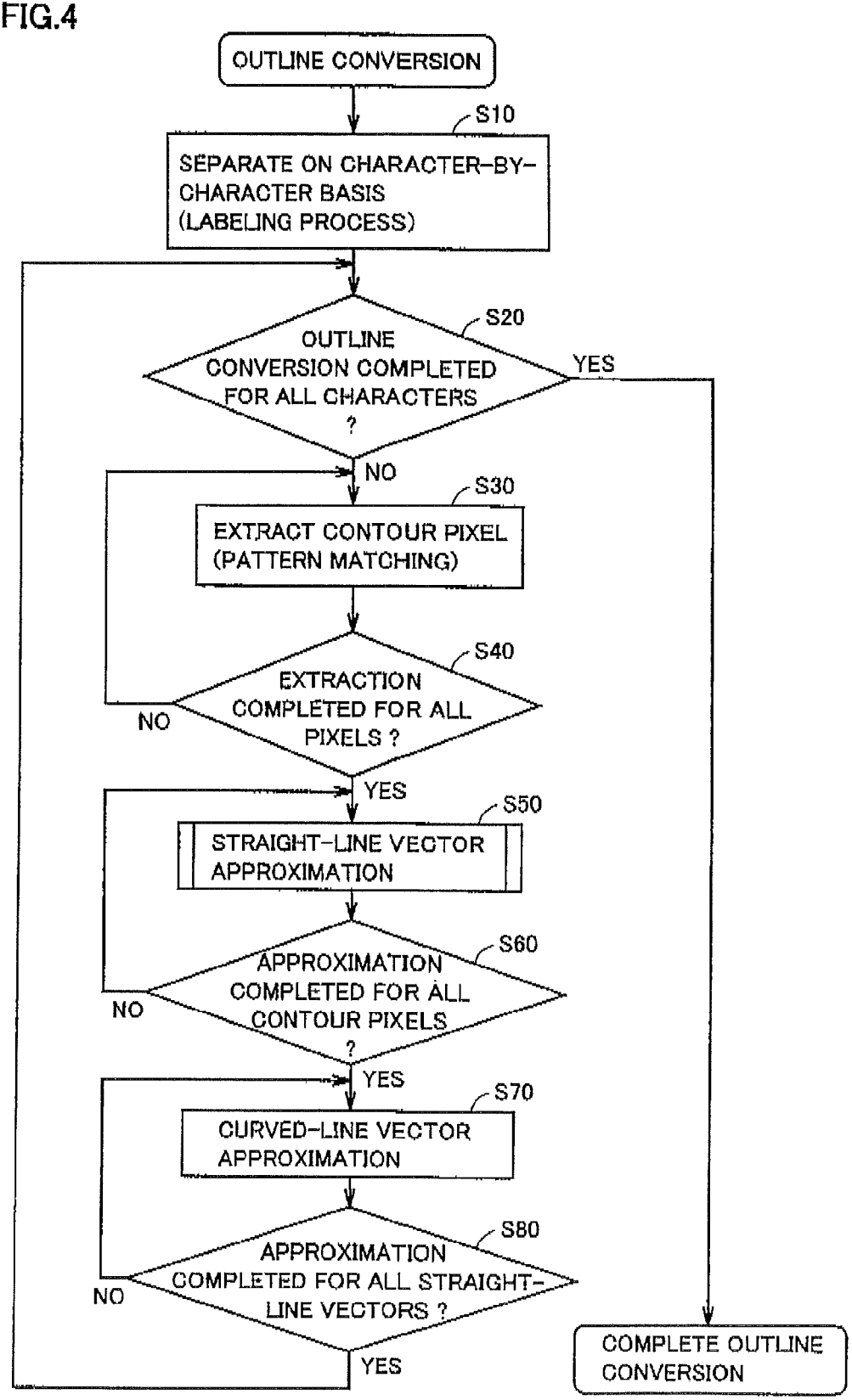
FIG. 4 is a flowchart of an outline conversion process performed in the MFP in FIG. 1.

FIG. 4 is a flowchart of the process (outline conversion process) performed in contour pixel extraction unit 232, straight-line vector approximation processing unit 233 and curved-line vector approximation processing unit 234 at the time when the image data is converted to the above-described PDF file. The outline conversion process will be hereinafter described in detail.

Referring to FIG. 4, when the binarized image data is input to contour pixel extraction unit 232, then in step S10, contour pixel extraction unit 232 separates the image data of the character area on a character-by-character basis. The process then proceeds to step S20.

In step S20, contour pixel extraction unit 232 determines whether all the characters separated in step S10 have been processed in steps S30 to S80. If it is determined that all the characters have been processed, the outline conversion process is terminated. If it is determined that all the characters have not been processed, the process proceeds to step S30.

In step S30, contour pixel extraction unit 232 selects, as an object to be processed, the character which has not been processed in steps S30 to S80 from the characters separated in step S10, and extracts a contour pixel by pattern matching from the character to be processed. The process then proceeds to step S40.

By the process in step S30, as described above, the pixel surrounded by a chain double-dashed line in FIG. 5B is extracted as a contour pixel.

In step S40, contour pixel extraction unit 232 determines whether all the contour pixels are extracted from the character to be processed. If it is determined that all the contour pixels are extracted, the process proceeds to step S50.

In step S50, as described above, straight-line vector approximation processing unit 233 performs straight-line approximation for a plurality of contour pixels in accordance with a predetermined algorithm and based on the contour pixels extracted by contour pixel extraction unit 232. The approximated straight lines are then sequentially connected to each other to form a straight-line vector and to perform straight-line vector approximation for the contour of the character which is to be processed. The process then proceeds to step S60. It is to be noted that any known methods are applicable as a straight-line approximation algorithm.

The straight-line vector approximation process in step S50 will be described below.

In step S60, straight-line vector approximation processing unit 233 determines whether the straight-line vector approximation is completed for all the contour pixels extracted from the character to be processed. If it is determined that the approximation is not completed, the process goes back to step S50, and if it is determined that the approximation is completed, the process proceeds to step S70.

Figure 6:
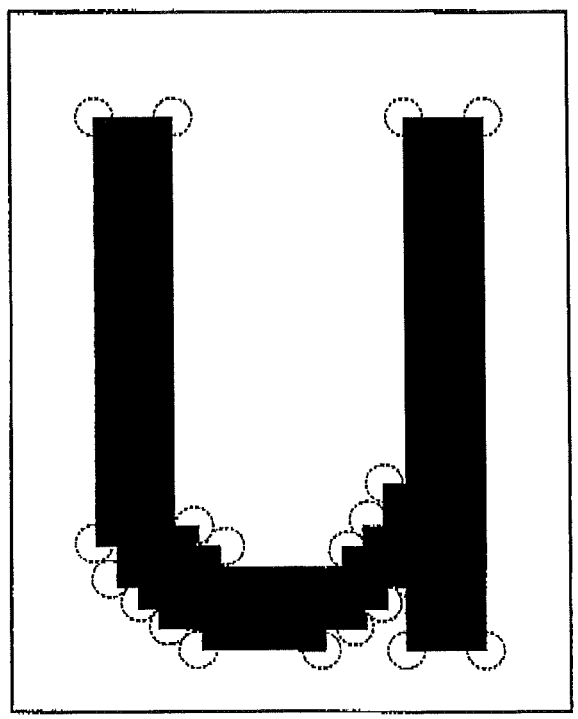
FIG. 6 is a diagram schematically showing the contour pixels extracted in the outline conversion process in FIG. 4.

FIG. 6 is a diagram schematically showing contour pixels, in the case where a character "u" is selected as an object to be processed, extracted from the image of the character.

Figure 7:
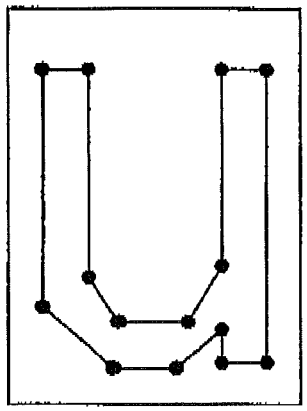
FIG. 7 is a diagram showing an example of an image obtained by straight-line vector approximation in the outline conversion process in FIG. 4.

FIG. 6 shows contour pixels extracted from the character image "u" which are indicated by dotted line circles. FIG. 7 shows the resultant by straight-line vector approximation for the character image based on these contour pixels.

FIG. 7 shows a state where the straight-line vectors are connected to each other by black dots.

In step S70, for the character to be processed which is approximated to a straight-line vector as shown in FIG. 7, the control point is set as appropriate on each straight-line vector and then used to perform curved-line vector approximation for the contour to be processed. Subsequently, the process proceeds to step S80.

In step S80, curved-line vector approximation processing unit 234 determines whether the curved-line vector approximation is completed for all the straight-line vectors generated in step S50 for the character image to be processed. If it is determined that the approximation is not completed, the process goes back to step S70, and if it is determined that the approximation is completed, the process goes back to step S20.

Figure 8:
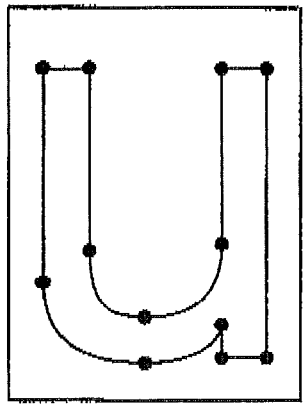
FIG. 8 is a diagram showing an example of an image obtained by curved-line vector approximation in the outline conversion process in FIG. 4.

When the curved-line vector approximation is performed for all the straight-line vectors by the process in step S70, the character image represented by straight-line vectors shown in FIG. 7 is converted to a character image including curved lines as shown in FIG. 8.

Figure 9:
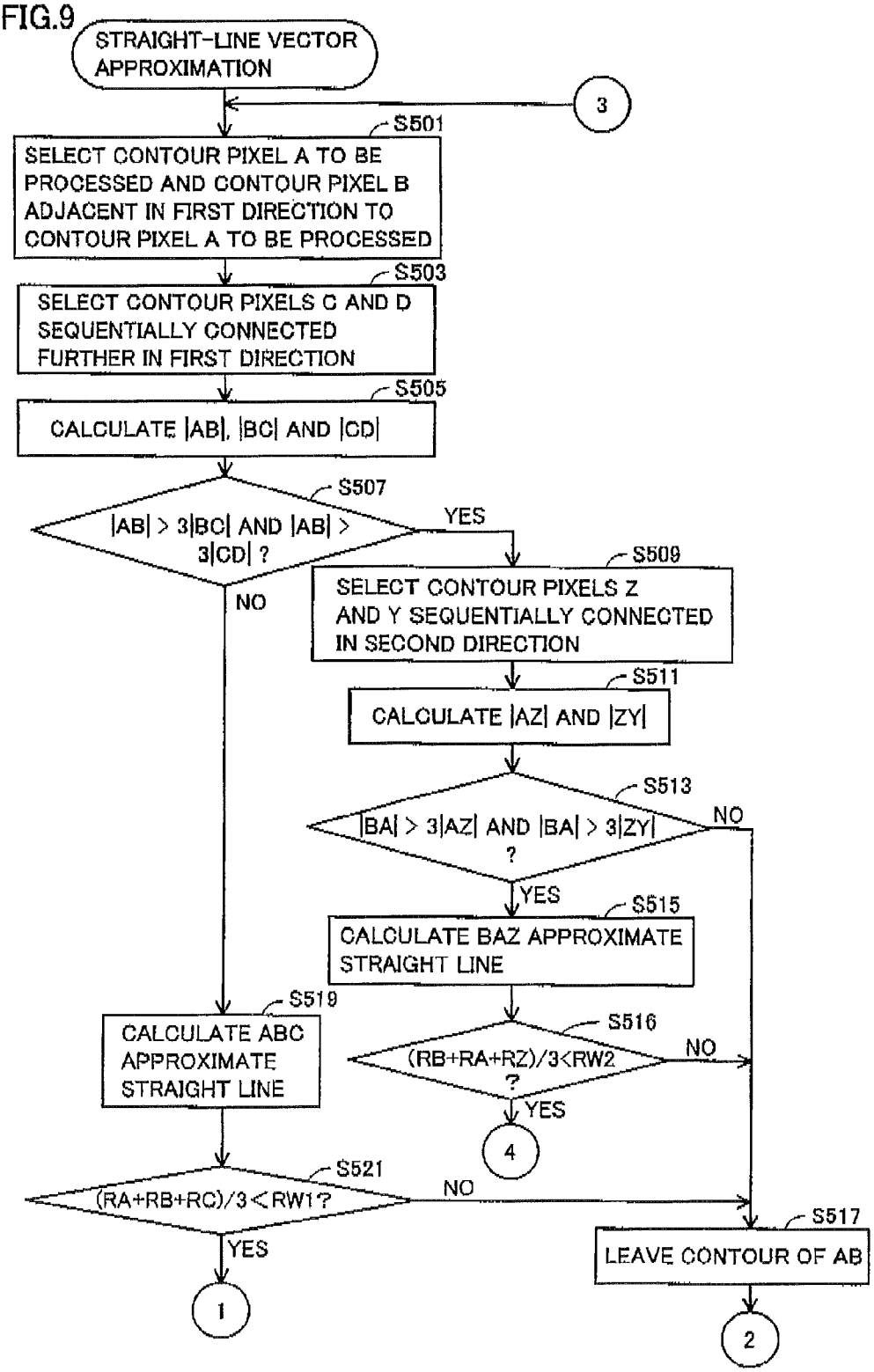
FIG. 9 is a flowchart showing a subroutine of the straight-line vector approximation process in FIG. 4.
Figure 10:
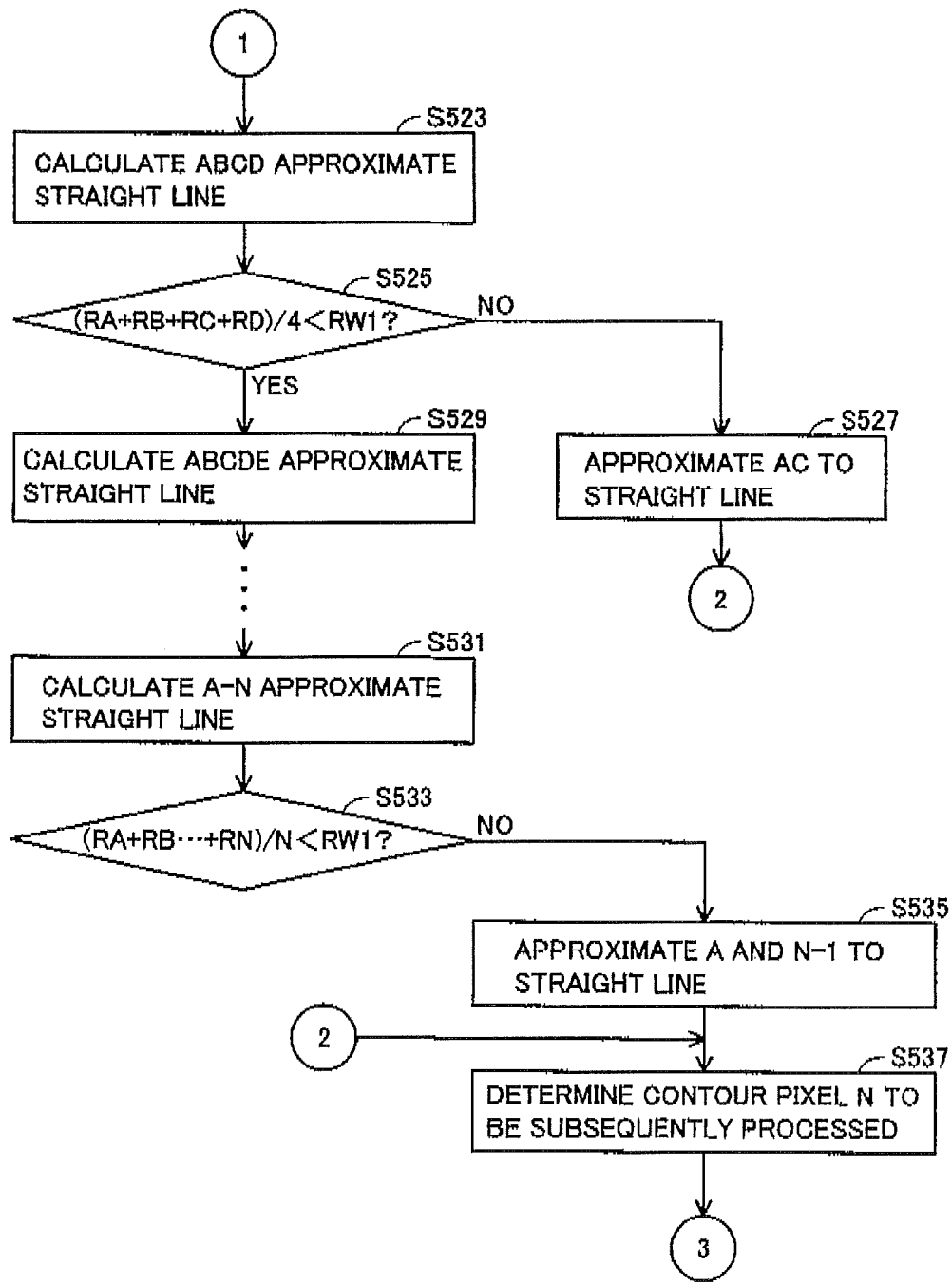
FIG. 10 is a flowchart showing a subroutine of the straight-line vector approximation process in FIG. 4.
Figure 11:
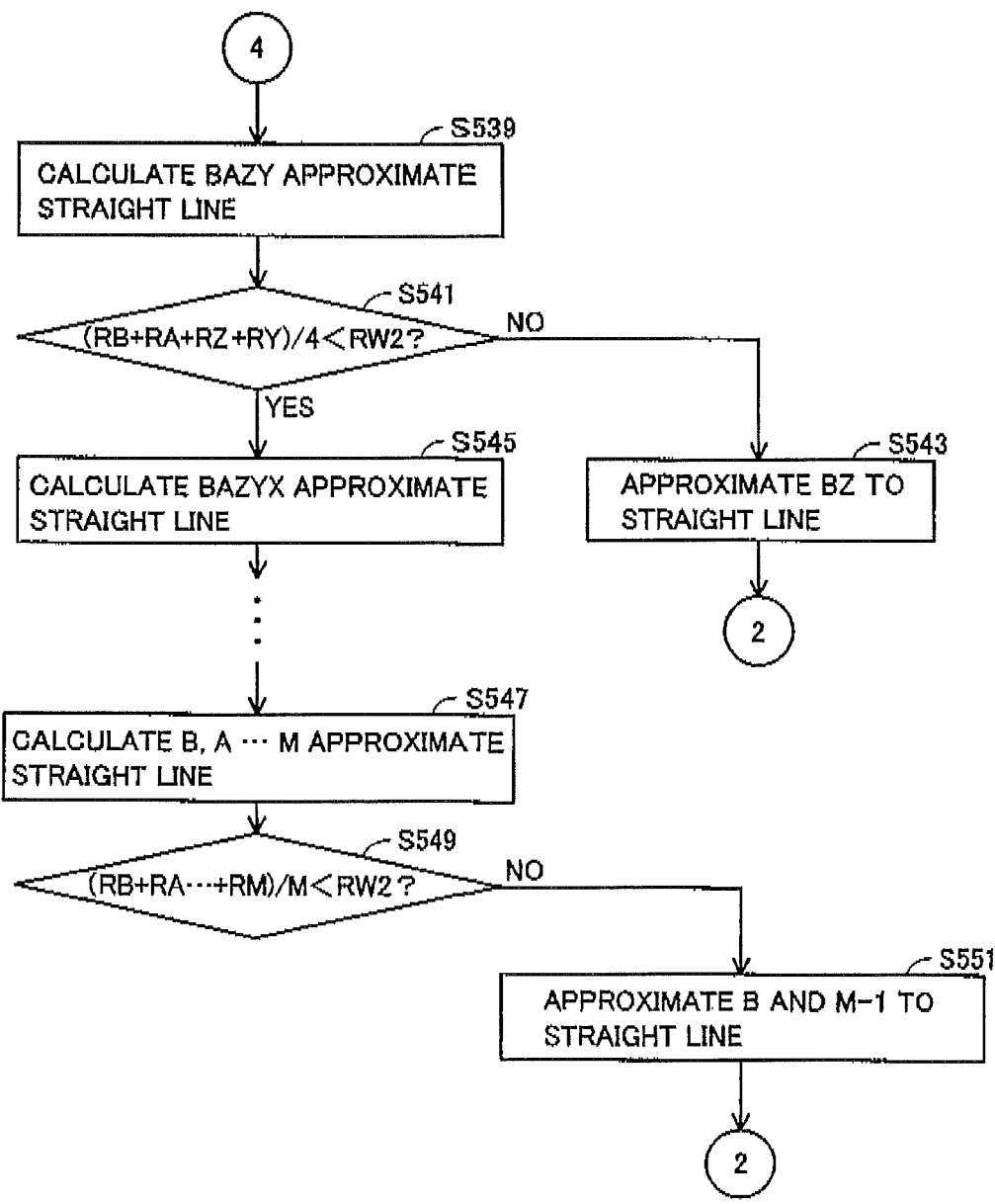
FIG. 11 is a flowchart showing a subroutine of the straight-line vector approximation process in FIG. 4.

FIGS. 9-11 each are a flowchart showing a subroutine of the straight-line vector approximation process in step S50 in FIG. 4.

First, referring to FIG. 9, in the straight-line vector approximation process, a contour pixel to be processed and a contour pixel adjacent thereto are selected from the contour pixels extracted from the character image to be processed, and then the process proceeds to step S503. In the following description, as a matter of convenience, the contour pixel to be processed is designated as a "contour pixel A", a direction in which the contour pixel to be processed is adjacent to the next contour pixel as described above is designated as the "first direction", and the contour pixel adjacent to the contour pixel to be processed is designated as a "contour pixel B".

Figure 12:
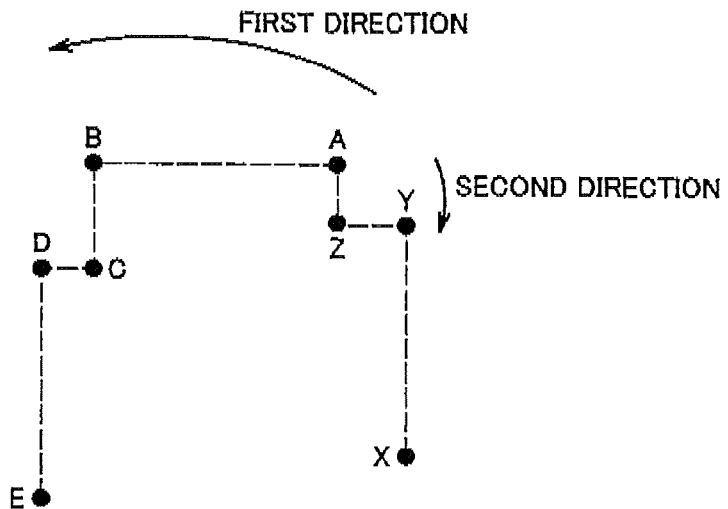
FIGS. 12-15 are diagrams for illustrating the straight-line vector approximation process according to the present embodiment.

FIG. 12 is a diagram showing a part of the arrangement in a portion of a plurality of contour pixels extracted from the binarized image of the character image to be processed. In FIG. 12, points X, Y, Z, A, B, C, D, and E are arranged in a counterclockwise direction (the first direction).

Points A and B in FIG. 12 are assumed to be contour pixels A and B, respectively, which are selected in step S501 as described above.

Further referring to FIG. 9, in step S503, with respect to contour pixel A to be processed, in addition to contour pixel B adjacent thereto in the first direction, the contour pixel (point C in FIG. 12) adjacent in the first direction to contour pixel B and the contour pixel (point D in FIG. 12) adjacent in the first direction to contour pixel C are selected, and then, the process proceeds to step S505.

In step S505, each distance between adjacent pixels of the four contour pixels selected in steps S501 and S503 is calculated. That is, each distance between points A and B (|AB|), between points B and C (|BC|), and between points C and D (|CD|) is calculated.

In step S507, it is determined whether |AB| is longer than three times |BC|, and |AB| is longer than three times |CD|. If it is determined that |AB| is longer than three times |BC| and |AB| is longer than three times |CD|, the process proceeds to step S509. If not, the process proceeds to step S519.

In step S509, two contour pixels (contour pixels Z and Y in FIG. 12) sequentially connected in the second direction from the contour pixel (contour pixel A) to be processed are selected, and then, the process proceeds to step S511.

As shown in FIG. 12, the second direction corresponds to a direction opposite to the first direction, for example, a clockwise direction.

In step S511, the distance between the contour pixel to be processed and the two contour pixels sequentially connected which are selected in step S509 (that is, distance |AZ| between points A and Z and distance |ZY| between points Z and Y) is calculated, and then, the process proceeds to step S513.

In step S513, it is determined whether |BA| is longer than three times |AZ| and longer than three times |ZY|. It is to be noted that |BA| and |AB| both represent a distance between points A and B.

If it is determined that |BA| is longer than three times |AZ| and longer than three times |ZY|, the process proceeds to step S515. On the other hand, if |CB| is less than or equal to at least one of the length three times |AZ| and the length three times |ZY|, the process proceeds to step S517.

In step S517, the straight line connecting contour pixel A to be processed and contour pixel B adjacent thereto in the first direction is left as a straight-line vector forming a contour in the straight-line vector approximation data of the character image to be processed. Then, the process proceeds to step S537.

On the other hand, in step S515, the expression of the approximate straight line for points B, A and Z is calculated, and the process proceeds to step S516, Furthermore, in step S519, the expression of the approximate straight line for points A, B and C is calculated, and the process proceeds to step S521.

Figure 13:
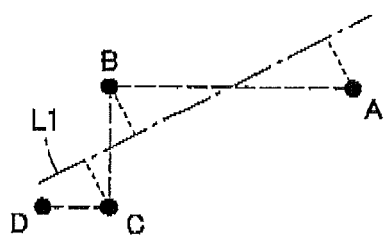

The approximate straight line for the three points described herein corresponds to a straight line which is equidistant from these three points. For example, the approximate straight line for points A, B, and C corresponds to a straight line which is equidistant from these three points, and for example, shown by a dashed-dotted line L1 in FIG. 13.

In step S516, it is determined whether the sum of the distances between the approximate straight line calculated in S515 and points Z, A and B (or the average of the distances between the approximate straight line and the points) is less than a predetermined threshold value RW2. If it is determined that the sum of the distances (or the average thereof) is less than threshold value RW2, the process proceeds to step S539 (see FIG. 11). If not, the process proceeds to step S517. In step S516 in FIG. 9, the distances between the approximate straight line calculated in step S519 and points B, A and Z are indicated by RB, RA and RZ, respectively.

On the other hand, in step S521, it is determined whether the sum of the distances between the approximate straight line calculated in S519 and points A-C (or the average of the distances between the approximate straight line and these points) is less than a predetermined threshold value RW1. If it is determined that the sum of the distances (or the average thereof) is less than threshold value RW1, the process proceeds to step S523. If not, the process proceeds to step S517, In step S521 in FIG. 9, the distances between the approximate straight line calculated in step S519 and points A-C are indicated by RA, RB and RC, respectively, Referring to FIG. 10, in step S523, the approximate straight line with respect to points A, B, C, and D is calculated, and the process proceeds to step S525.

In step S525, it is determined whether the average of the distances between the approximate straight line calculated in step S523 and points A-D is less than predetermined threshold value RW1. If it is determined that the average is less than RW1, the process proceeds to step S529. If not, the process proceeds to step S527.

In step S527, three points A-C are approximated to a straight line directly connecting points A and C (a straight line AC), to generate data obtained after straight-line vector approximation. Then the process proceeds to step S537.

In step S529, the approximate straight line with respect to five points A-E is calculated.

After this process, as in steps S521 and S525, with respect to a plurality of adjacent contour pixels which are extracted from the character image to be processed, an approximate straight line which is equidistant from the plurality of pixels is calculated. It is then determined whether the sum of the distances (or the average thereof) between the approximate straight line and the points is less than threshold value RW1. If the sum of the distances (or the average thereof) is less than threshold value RW1, the contour pixel connected further in the first direction (see FIG. 12) is added to the contour pixels used in the previous calculation of the approximate straight line, to calculate a new approximate straight line. Then, the sum of the distances (or the average thereof) between the approximate straight line and the points is compared with threshold value RW1.

On the other hand, if the average of the distances between the approximate straight line and the contour pixels is net less than threshold value RW1, the straight line directly connecting the contour pixel immediately preceding the last contour pixel to be subjected to calculation of the approximate straight line and the contour pixel to be processed is assumed to be an approximate straight line included in the data obtained after straight-line vector approximation. The calculation of the approximate straight line is carried out until the above-described average of the distances reaches a value of not less than threshold value RW1.

In other words, in the case where the approximate straight line is calculated using those from the contour pixel to be processed up to a contour pixel N which is the Nth of a sequence of the contour pixels connected in the first direction (see FIG. 12) (S531), the calculation of the approximate straight line and the like is continued until the average of the distances between points A-N and the approximate straight line reaches a value of not less than threshold value RW1. The calculation is continued until the average of the distances between the calculated approximate straight line and adjacent pixels used for obtaining the approximate straight line reaches a value of not less than threshold value RW1. If the adjacent pixel at the point where the average reaches a value of not less than threshold value RW1 is found (S533), the approximate straight line calculated using those up to the pixel immediately preceding this adjacent pixel (the approximate straight line obtained by using those up to contour pixel (N-1) in the ease where the average of the distances between the contour pixels and the approximate straight line reaches a value of not less than threshold value RW1 when the approximate straight line is calculated using those up to adjacent pixel N) is assumed to be a straight-line vector used for approximation of contour pixels A to (N-1). Then, the process proceeds to step S537.

Referring to FIG. 11, in step S539, the approximate straight line with respect to points B, A, Z, and Y is calculated, and the process proceeds to step S541.

In step S541, it is determined whether the average of the distances between the approximate straight line calculated in step S539 and points B, A, Z and Y is less than predetermined threshold value RW2. If it is determined that the average is less than RW2, the process proceeds to step S545. If not, the process proceeds to step S543.

In step S543, three points including points B, A and Z are approximated to a straight line directly connecting points B and Z (straight line BZ), to generate data obtained after straight-line vector approximation. Then, the process proceeds to step S537.

In step S545, the approximate straight line with respect to five points including points B, Y, and X is calculated.

After this process, as in steps S516 and S541, with respect to a plurality of adjacent contour pixels which are extracted from the character image to he processed, an approximate straight line which is equidistant from the plurality of pixels is calculated. It is then determined whether the sum of the distances (or the average thereof) between the approximate straight line and the points is less than threshold value RW2. If the sum of the distances (or the average thereof) is less than threshold value RW2, the contour pixel connected further in the second direction (see FIG. 12) is added to the contour pixels used in the previous calculation of the approximate straight line, to calculate a new approximate straight line, Then, the sum of the distances (or the average thereof) between the approximate straight line and the points is compared with threshold value RW2.

On the other hand, if the average of the distances between the approximate straight line and the contour pixels is not less than threshold value RW2, the straight line directly connecting the contour pixel immediately preceding the last contour pixel to be subjected to calculation of the approximate straight line and the contour pixel to be processed is assumed to be an approximate straight line included in the data obtained after straight-line vector approximation. The calculation of the approximate straight line is carried out until the above-described average of the distances reaches a value of not less than threshold value RW2.

In other words, in the case where the approximate straight line is calculated using those from the contour pixel to be processed up to a contour pixel M which is the Mth of a sequence of the contour pixels connected in the second direction (see FIG. 12) (S547), the calculation of the approximate straight line and the like is continued until the average of the distances between the approximate straight line and those from point B to the Mth point sequentially connected from point B in a clockwise direction (the second direction) reaches a value of not less than threshold value RW2. The calculation is continued until the average of the distances between the calculated approximate straight line and adjacent pixels used for obtaining the approximate straight line reaches a value of not less than threshold value RW2. If the adjacent pixel at the point where the average reaches a value of not less than threshold value RW2 is found (S549), the approximate straight line calculated using those up to the pixel immediately preceding this adjacent pixel (the approximate straight line obtained by using those up to contour pixel (M-1) in the case where the average of the distances between the contour pixels and the approximate straight line reaches a value of not less than threshold value RW2 when the approximate straight line is calculated using those up to adjacent pixel M) is assumed to be a straight-line vector used for approximation of those from contour pixel B to contour pixel (M-1) sequentially connected in the second direction. Then, the process proceeds to step S537.

Referring back to FIG. 10, in step S537, the contour pixel to be subsequently processed is determined, and the process goes back to step S501 (see FIG. 9).

In step S537, the contour pixel adjacent in the first direction to the last contour pixel which is subjected to straight-line approximation in step S517, S527, S535, S543, or S551 is determined as a contour pixel to be subsequently processed.

According to the present embodiment described above, in straight-line vector approximation, with regard to the contour pixel (contour pixel A) to be processed, if the prescribed conditions are satisfied, the first straight line (straight line AB) connecting the contour pixel to be processed (contour pixel A) and the contour pixel (contour pixel B) adjacent in the first direction thereto is left as a straight-line vector in the data obtained after straight-line vector approximation.

It is preferable that threshold values RW1 and RW2 in the above description are set independently of each other, and also preferable that those values indicated by M and N are set independently of each other.

Figure 14:

In other words, as in step S507, in the case where the straight line (line segment AB) is greater in length than three times a straight line BC adjacent to straight line AB and greater in length than three times a straight line CD adjacent in the first direction to straight line BC, as shown in FIG. 14, straight line AB is assumed to be a contour of the image data in the data subjected to straight-line vector approximation (step S517). In other words, in the present embodiment, the straight line directly connecting contour pixels adjacent to each other can be left as it is in the data obtained after straight-line vector approximation.

Figure 15:
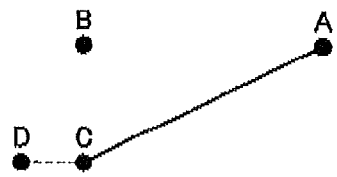

Furthermore, in the present embodiment, in the case where the length of the above-mentioned straight line (line segment AB) is less than or equal to three times straight line BC adjacent to straight line AB, or less than or equal to three times straight line CD adjacent in the first direction to straight line BC, for example, as shown in FIG. 15, straight line AC directly connecting points A and C is assumed to be a contour of the image data in the data subjected to straight-line vector approximation (stop S527).

According to the present embodiment described with reference to FIG. 9, in step S507, in the case where straight line AB is greater in length than three times straight line BC and greater in length than three times straight line CD (YES in step S507), the process directly proceeds to step S517 (omitting steps S509-S515), and the process for leaving straight line AB as a contour in the data obtained after straight-line approximation may be performed in step S517.

In the present embodiment as described above, pixels adjacent to each other in a predetermined direction among a plurality of contour pixels extracted from the binarized image data are connected by a straight line. If this straight line is greater in length than three times the straight line adjacent thereto and also greater in length than three times the straight line connected further ahead, this straight line is left as a contour in the data obtained after straight-line vector approximation.

In the present embodiment, although "three" is employed as an example of the factor of the length when determining whether or not the straight line connecting adjacent contour pixels is left as a contour in the data obtained after straight-line vector approximation, the factor in the present invention is not limited to this value.

FIGS. 16A-16F each show an example of the outlined data generated by changing the factor used in the straight-line vector approximation process.

Figure 16A:
FIG. 16A shows an input binarized image in which the contour pixels are to be extracted in the straight-line vector approximation process according to the present embodiment.
Figure 16B:
FIG. 16B shows an outlined image in the case where the factor to be used is set to 1 in the straight-line vector approximation process according to the present embodiment.
Figure 16C:
FIG. 16C shows an outlined image in the case where the factor to be used is set to 2 in the straight-line vector approximation process according to the present embodiment.
Figure 16D:
FIG. 16D shows an outlined image in the case where the factor to be used is set to 3 in the straight-line vector approximation process according to the present embodiment.
Figure 16E:
FIG. 16E shows an outlined image in the case where the factor to be used is set to 4 in the straight-line vector approximation process according to the present embodiment.
Figure 16F:
FIG. 16F shows an outlined image in the case where the factor to he used is set to 5 in the straight-line vector approximation process according to the present embodiment.
Figure 17:
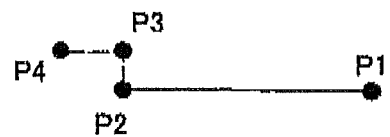
FIGS. 17 and 18 are diagrams for illustrating a general outlining process.
Figure 18:
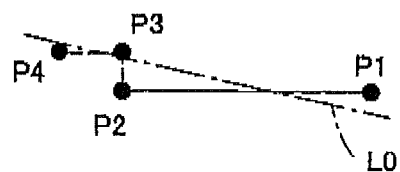

FIG. 16A shows an input binarized image in which the contour pixels are to be extracted. FIG. 16B shows an outlined image in which the factor used in steps S507 and the like is set to 1. FIG. 16C shows an outlined image in which the factor used in step S507 and the like is set to 2. FIG. 16D shows an outlined image in which the factor used in step S507 and the like is set to 3. FIG. 16E shows an outlined image in which the factor used in step S507 and the like is set to 4. FIG. 16F shows an outlined image in which the factor used in step S507 and the like is set to 5. It is to be noted that resultant outlined image in the case where the factor to be used is set to a value of not less than 5 is similar to that shown in FIG. 16F.

FIGS. 16A-16F each show images of alphabets "E" and "Y".

In the resultant image shown in FIG. 16B, as shown within an elliptical shape illustrated in dashed lines, the roughness of the image represented by binarized pixels is not completely eliminated.

In FIG. 16C, the roughness of the image as shown within an elliptical shape illustrated in dashed lines in FIG. 16B is almost eliminated, in which only slight roughness in the image is left in a portion indicated by a dashed-line circle.

In FIG. 16D, an almost ideal outlined image is obtained.

In FIG. 16E, as shown by a dashed-line circle, a line on the underside of the outer contour which should be represented by a horizontal line is represented by a line obliquely extending in the lower right direction as shown by a line LX3.

Figure 19A:
FIG. 19A is a diagram showing an example of an image binarized in the previous step of the outlining process according to the conventional related art.
Figure 19B:
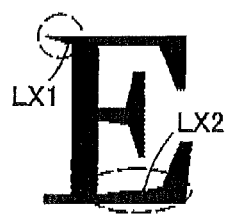
FIG. 19B is a diagram showing an example of an image outlined in accordance with the conventional related art.

In FIG. 16F, as in FIG. 19B, lines which should extend in a horizontal direction extend obliquely in the lower right direction and in the upper right direction, respectively.

As described above, it is preferable to set the threshold value factor to 2-4, and most preferably about 3.

According to the present embodiment, in the image outlining process, when contour pixels are extracted from the binarized image data, it is determined depending on the length of the straight line produced by connecting two adjacent contour pixels whether the straight line is left as it is when the binarized image is approximated to a straight line.

Consequently, in the image which is subjected to straight-line approximation when generating an outline image, a straight line may be left as it is depending on the length thereof as described above.

Accordingly, in the process of outlining the binarized image, the image processing is carried out by which straight lines forming an outer contour of the binarized image are configured in such a manner that some portions appropriate for a straight line are left as they are and remaining portions each are modified to a smooth curved line and the like. This allows generation of an outline image in which the outer contour included in the binarized image is configured in such a manner that portions appropriate for a straight line are left as they are and remaining portions each are modified to a smoothed curved line and the like by the above-described image processing.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An outlining method comprising the steps of:
   extracting contour pixels from binarized image data; and
   performing straight-line approximation for a contour of said image data based on said extracted contour pixels, said step of performing straight-line approximation including the steps of,
   calculating a distance between adjacent contour pixels among said extracted contour pixels, and
   determining based on a result of a comparison between a length of a first straight line connecting a first contour pixel and a second contour pixel adjacent to said first contour pixel and a length of a second straight line connecting said second contour pixel and a third contour pixel adjacent to said second contour pixel whether said first straight line is used as a contour of said image data.

2. The outlining method according to claim 1, wherein said step of determining whether said first straight line is used as a contour includes the step of determining that said first straight line is used as a contour of said image data in a case where said first straight line is greater in length than said second straight line.

3. The outlining method according to claim 2, wherein said step of determining whether said first straight line is used as a contour includes the step of determining that said first straight line is used as a contour of said image data in a case where said first straight line is greater in length than a first predetermined number of times said second straight line and greater in length than a second predetermined number of times a third straight line connecting said third contour pixel and a fourth contour pixel adjacent to said third contour pixel.

4. The outlining method according to claim 3, wherein each of said first and second predetermined numbers of times is 2 to 4.

5. The outlining method according to claim 3, wherein said step of determining whether said first straight line is used as a contour includes the step of determining that said first straight line is used as a contour of said image data in a case where said first straight line is greater in length than a third predetermined number of times a fourth straight line connecting said first contour pixel and a fifth contour pixel adjacent to said first contour pixel on an opposite side of said second contour pixel adjacent to said first contour pixel when said first straight line is, in length, less than or equal to said first predetermined number of times said second straight line and less than or equal to said second predetermined number of times said third straight line.

6. An image compression method comprising the step of compressing image data including at least image data outlined by the outlining method according to claim 1.

7. An outlining apparatus comprising:
   an extraction unit configured to extract contour pixels from binarized image data; and
   an approximation unit configured to perform straight-line approximation for a contour of said image data based on said extracted contour pixels,
   said approximation unit including
   a calculation unit configured to calculate a distance between adjacent contour pixels among said extracted contour pixels; and
   a determination unit configure to determine based on a result of a comparison between a length of a first straight line connecting a first contour pixel and a second contour pixel adjacent to said first contour pixel and a length of a second straight line connecting said second contour pixel and a third contour pixel adjacent to said second contour pixel whether said first straight line is used as a contour of said image data.

8. The outlining apparatus according to claim 7, wherein said determination unit is configured to determine that said first straight line is used as a contour of said image data in a case where said first straight line is greater in length than said second straight line.

9. The outlining apparatus according to claim 8, wherein said determination unit is configured to determine that said first straight line is used as a contour of said image data in a case where said first straight line is greater in length than a first predetermined number of times said second straight line and greater in length than a second predetermined number of times a third straight line connecting said third contour pixel and a fourth contour pixel adjacent to said third contour pixel.

10. The outlining apparatus according to claim 9, wherein each of said first and second predetermined numbers of times is 2 to 4.

11. The outlining apparatus according to claim 9, wherein said determination unit is configured to determine that said first straight line is used as a contour of said image data in a case where said first straight line is greater in length than a third predetermined number of times a fourth straight line connecting said first contour pixel and a fifth contour pixel adjacent to said first contour pixel on an opposite side of said second contour pixel adjacent to said first contour pixel when said first straight line is, in length, less than or equal to said first predetermined number of times said second straight line and less than or equal to said second predetermined number of times said third straight line.

12. An image compression apparatus compressing image data including at least image data outlined by the outlining apparatus according to claim 7.

13. A computer readable medium storing a computer executable program for outlining, the program comprising program code for causing a computer to execute the steps of:
   extracting contour pixels from binarized image data; and
   performing straight-line approximation for a contour of said image data based on said extracted contour pixels, said step of performing straight-line approximation including the steps of
   calculating a distance between adjacent contour pixels among said extracted contour pixels, and
   determining based on a result of a comparison between a length of a first straight line connecting a first contour pixel and a second contour pixel adjacent to said first contour pixel and a length of a second straight line connecting said second contour pixel and a third contour pixel adjacent to said second contour pixel whether said first straight line is used as a contour of said image data.

14. The computer readable medium according to claim 13, wherein said step of determining whether said first straight line is used as a contour includes the step of determining that said first straight line is used as a contour of said image data in a case where said first straight line is greater in length than said second straight line.

15. The computer readable medium according to claim 14, wherein said step of determining whether said first straight line is used as a contour includes the step of determining that said first straight line is used as a contour of said image data in a case where said first straight line is greater in length than a first predetermined number of times said second straight line and greater in length than a second predetermined number of times a third straight line connecting said third contour pixel and a fourth contour pixel adjacent to said third contour pixel.

16. The computer readable medium according to claim 15, wherein each of said first and second predetermined numbers of times is 2 to 4.

17. The computer readable medium according to claim 15, wherein said step of determining whether said first straight line is used as a contour includes the step of determining that said first straight line is used as a contour of said image data in a case where said first straight line is greater in length than a third predetermined number of times a fourth straight line connecting said first contour pixel and a fifth contour pixel adjacent to said first contour pixel on an opposite side of said second contour pixel adjacent to said first contour pixel when said first straight line is, in length, less than or equal to said first predetermined number of times said second straight line and less than or equal to said second predetermined number of times said third straight line.

18. A computer readable medium storing a computer executable program for compressing image data including at least image data outlined by executing the program according to claim 13.

* * * * *